United States Patent [19]

Barrett

[11] 4,260,925
[45] Apr. 7, 1981

[54] STATOR FOR AN ELECTROMAGNETIC TRANSDUCER

[76] Inventor: Edward L. Barrett, 506 Malden Ave., LaGrange Park, Ill. 60525

[21] Appl. No.: 896,687

[22] Filed: Apr. 17, 1978

Related U.S. Application Data

[63] Continuation of Ser. No. 716,589, Aug. 23, 1976, abandoned.

[51] Int. Cl.³ .............................................. H02K 1/00
[52] U.S. Cl. .................................. 310/216; 310/254; 310/218
[58] Field of Search ...................... 310/68 R, 168, 169, 310/170, 171, 180, 179, 185, 202, 216–218, 254, 258, 259

[56] References Cited

U.S. PATENT DOCUMENTS

| | | | |
|---|---|---|---|
| 2,124,427 | 7/1938 | Morrill et al. | 310/254 X |
| 2,827,582 | 3/1958 | Krebs | 310/168 |
| 3,217,194 | 11/1965 | Terry et al. | 310/185 X |
| 3,493,800 | 2/1970 | Barrett | 310/168 |
| 3,518,473 | 6/1970 | Nordebo | 310/180 X |
| 4,038,575 | 7/1977 | Nordebo | 310/179 |

Primary Examiner—Donovan F. Duggan
Attorney, Agent, or Firm—Gary, Juettner & Pyle

[57] ABSTRACT

An improved stator for an electromagnetic transducer, such as an alternator, is characterized by a plurality of pole sections joined by a core and configured to increase the space available for stator coil windings and to minimize the length of the winding turns thereof.

In the disclosed embodiment, the core is annular and the pole sections extend inwardly thereof. Each pole section includes a relatively wide base or trunk portion joined at one end with the core and formed at an opposite end into a pair of stator poles. The poles are in an annular array, and the stator is particularly adapted for use with a three-phase alternator. When so used, the stator is provided with three electrically separate winding sections, each of which has a plurality of coils connected in series with alternate coils wound in opposite directions. The coils of each section are alternately positioned around adjacent poles of adjacent pole sections, and around the base of a pole section not otherwise encompassed by a coil of that winding section, and each winding section is angularly displaced around the core relative to each of the other two winding sections.

As a consequence of the configuration of the stator, for a given stator size the number of coil winding turns which may be provided on the stator is increased, yet the length of the turns is decreased so that the resistance of the coils is decreased. This results in an increased capacity for an electromagnetic transducer of a given size.

11 Claims, 7 Drawing Figures

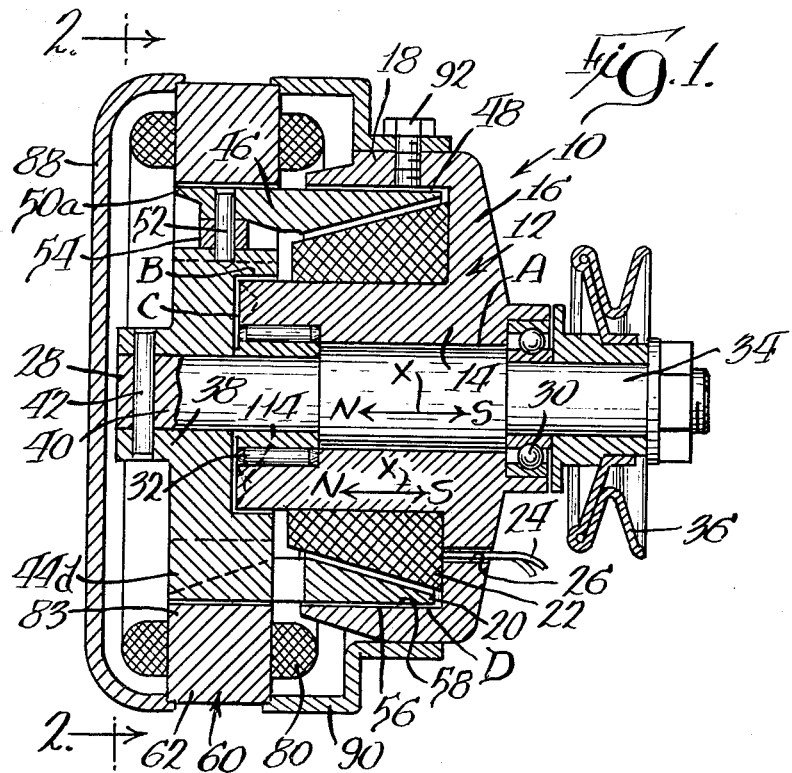
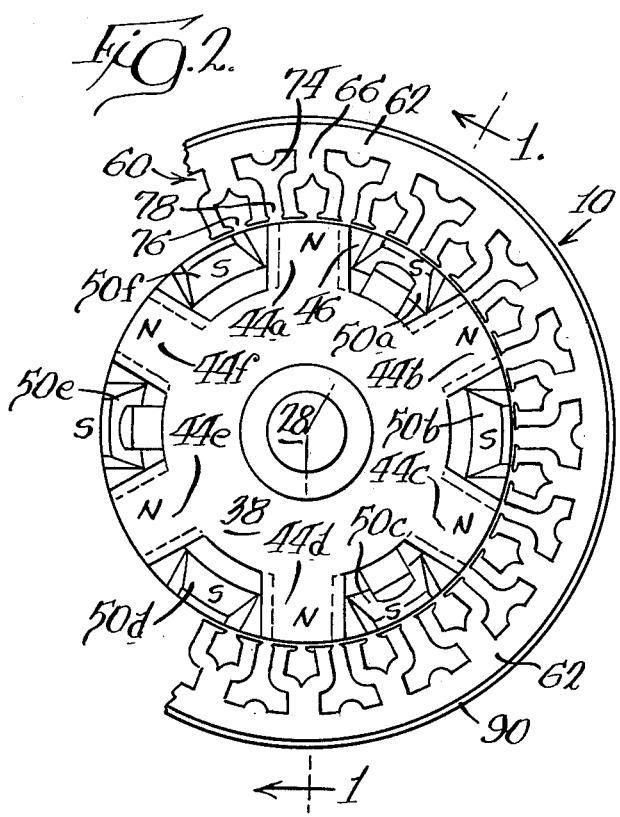
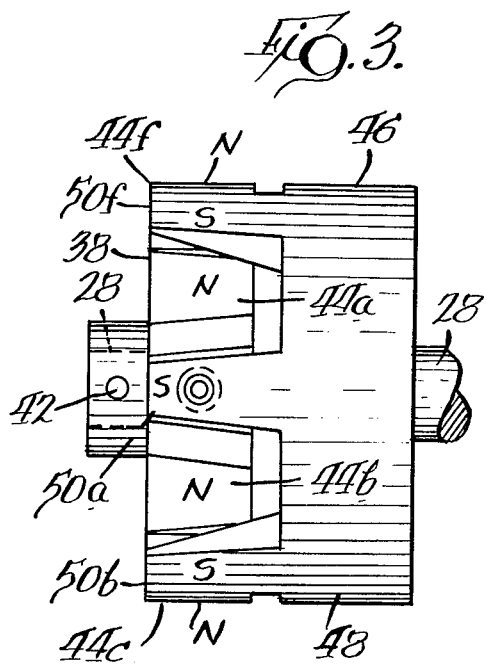

STATOR FOR AN ELECTROMAGNETIC TRANSDUCER

This application is a continuation of application Ser. No. 716,589 filed Aug. 23, 1976 now abandoned.

BACKGROUND OF THE INVENTION

The present invention relates to an improved stator for an electromagnetic transducer.

Alternators are commonly employed as the basic source of electrical power in automotive vehicles. The alternator output is rectified, and is used to charge the vehicle battery and to operate a variety of electrical devices incorporated in the vehicle. Recent changes in standard or customarily ordered optional equipment for such vehicles, such as electrically heated rear windows, air conditioners, CB radios, etc., have imposed heavier power requirements on the vehicle alternator than heretofore. As a consequence, alternators of increased capacity are needed, requiring an increase in the size and the weight of the alternator. Unfortunately, increased size and weight is contraindicated by the limited space available within the engine compartments of late model automobiles and the need to minimize the weight thereof.

The rotary electromagnetic excitation structures of alternators include a series of alternate north and south magnetic rotor poles disposed concentrically with the stator and separated from the stator poles by a small gap. Most automotive alternators utilize a complete rotary excitation structure, including an excitation coil which rotates with the rotor, so that the exciting current for the coil must be applied through brush and slip-ring circuit connections. On the other hand, some alternators are of the so-called "brushless" construction, in which the exciting coil is stationary so that slip-rings and brushes can be eliminated. Brushless alternators afford substantial advantages with respect to elimination of the wear and maintenance problems associated with slip-rings and brushes. An excellent example of a brushless alternator construction is set forth in Barret U.S. Pat. No. 3,953,753, issued Apr. 27, 1976.

The alternators employed in vehicles are usually three-phase machines, and have stator windings which ordinarily comprise three multi-coil winding sections with the coils of each section connected in series. Conventionally, each coil in each section encircles three stator poles, and the coils of each section may be separated from each other by one to three stator poles that are not encircled by any coil of that section. In the aforementioned Barrett patent, an improved stator winding is provided wherein each coil in each winding section encompasses two stator poles, and is separated from the next adjacent coil in the same section by at least one pole not encompassed by a coil of that section, and wherein each winding section is angularly displaced around the stator relative to each of the other two sections.

To increase the power output from such alternators generally requires an increase in the number of turns in the coils of the winding sections which, with conventional stators, requires an increase in the size of the stator to accommodate the additional turns, and therefore an increase in the size of the alternator. For certain applications this may not be practical or desirable.

OBJECTS OF THE INVENTION

An object of the present invention is to provide an improved stator for electromagnetic transducers, which is of a design to increase the space available for coil windings therefor.

Another object of the present invention is to provide such a stator, the design of which also decreases the length of the turns of coils wound thereon, whereby a shorter length of wire is required for a given number of turns to decrease the resistance of the coil and increases its Q-factor.

A further object of the present invention is to provide such a stator for use with an alternator or other dynamoelectric machine or electromagnetic transducer, which reduces the total amount of copper required for the windings thereof without reducing the overall capacity of the machine.

Yet another object of the invention is to provide such a stator for use with an alternator, which is of a design to efficiently utilize coil winding space to improve the overall capacity for an alternator of given size and weight.

SUMMARY OF THE INVENTION

In accordance with the present invention, a stator for an electromagnetic transducer has poles configured to increase the space available for stator coil windings and to decrease the length of the turns of the coils.

In a preferred embodiment, the stator has an annular core and stator pole sections extend inwardly thereof. Each section includes a relatively wide base portion joined at one end with the core and extending inwardly thereof, and formed at an opposite end into a pair of stator poles. The ends of the stator poles lie along a circle concentric with the core.

When embodied in a dynamoelectric machine, such as a three-phase alternator, three electrically separate winding sections are provided on the stator. Each winding section has a plurality of coils connected in series with alternate coils wound in opposite directions. The coils of each winding section are alternately positioned around adjacent poles of adjacent pole sections and around the base of a pole section not otherwise encompassed by a coil of that winding section, and each winding section is angularly displaced around the core relative to each of the other two sections.

As a consequence of the configuration of the stator, the space available for the coils of the winding sections is increased and the length of the coil winding turns is decreased, whereby use of the stator in a dynamoelectric machine of given size and weight improves the capacity thereof.

The foregoing and other objects, advantages and features of the invention will become apparent from the following detailed description, when taken in conjunction with the appended drawings.

BRIEF DESCRIPTION OF THE DRAWINGS

FIG. 1 is a longitudinal, cross-section, elevation view of a three-phase alternator of a type which may advantageously incorporate the stator of the invention;

FIG. 2 is a transverse, cross-section, elevation view taken substantially along lines 2—2 of FIG. 1, showing the configuration of a preferred embodiment of the stator of the invention and its orientation with respect to a rotor of the alternator;

FIG. 3 is a side elevation view of the rotor for the alternator;

DETAILED DESCRIPTION

Figure 4A:
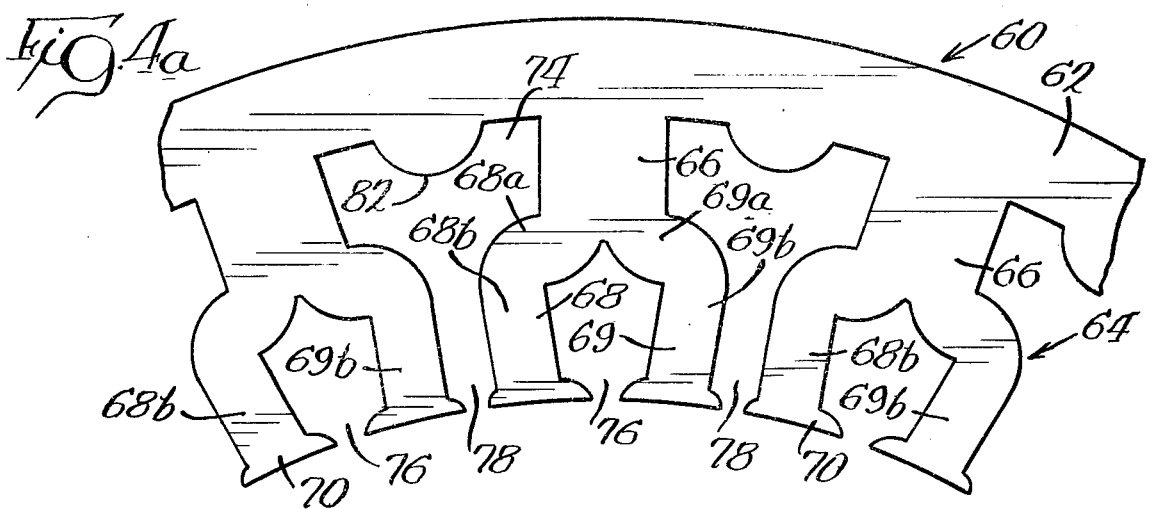
FIG. 4a is a diagrammatic axial view of a portion of a stator embodying the teachings of the invention, showing three of a plurality of identically configured pole sections of the stator forming six stator poles.

FIGS. 1, 2 and 3 illustrate a three-phase "brushless" alternator, indicated generally at 10, having a stator configured in accordance with a preferred embodiment of the present invention. The stator is shown as being embodied in a brushless alternator merely for illustrating one intended use thereof, it being understood that the stator may just as readily be used with any other suitable electromagnetic transducer, and that the invention contemplates such use.

The alternator 10 includes a stationary, integral, E-shaped excitation core of a magnetic material, indicated generally at 12, having a central tubular support 14, a base 16 and an annular flange 18 coaxial with and encompassing the tubular support. The support, base and flange together form an annular cavity 20 in which is mounted a dc excitation coil 22. Leads 24 for the coil are brought exterior of the core through a passage 26 in the base 16. A rotatable drive shaft 28 of a magnetic material extends axially through the coil support 14 and is rotatably mounted therewithin by a ball bearing 30 and a roller bearing 32. An end 34 of the shaft projects outwardly from the excitation core and has mounted thereon a pulley 36 to provide a means for rotating the shaft.

The magnetic excitation structure of the alternator includes a first rotor member 38 of magnetic material fastened to an end 40 of the shaft with a pin 42 which prevents relative rotation between the member and the shaft. As is best shown in FIGS. 2 and 3, the rotor member includes six integral, radially projecting poles 44a–44f, the number of which is not critical and may range from two to eight or even more. Also included is a second rotor member 46 having a continuous ring 48 of a magnetic material with a plurality of integral, axially projecting rotor poles 50a–50f. This second set of poles corresponds in number to the first set, and is disposed in spaced interleaved relation, one-for-one, with the poles of the first rotor member. Nonmagnetic means, such as a plurality of mounting pins 52 and spacers 54 mount the second rotor member on the first member for rotation therewith. The ring 48 of the second rotor member is concentrically aligned with the core flange 18 across a large-area radial air gap defined between an outer surface 56 of the ring and an inner surface 58 of the flange.

The alternator further includes an integral magnetic material stator, indicated generally at 60, configured in accordance with a preferred embodiment of the invention. Referring also to FIG. 4a, the stator includes an annular or circular core, ring or yoke 62 having a plurality of integral, symmetrically arranged identical pole sections or toothed elements, indicated generally at 64, extending inwardly thereof in an annular array. Each pole section has a relatively wide base or trunk 66 which extends from an outer end thereof radially inward of the core and which is formed or bifurcated at an inner end thereof to define two stator poles or teeth 68 and 69. The poles 68 and 69 have drastically diverging outer portions 68a and 69a, respectively, joining the base 66, and slightly converging inner portions 68b and 69b, respectively. The innermost end of each pole portion 68b and 69b is formed with an enlarged lip 70 defining a stator pole face. The bases 66 are substantially twice as wide as the poles 68 and 69, whereby in the use of the stator the base may readily carry the combined magnetic flux induced in the poles. To this end, the inner pole portions 68a and 69a are smooth curves to efficiently direct the flux between the poles and the base. The stator pole sections thus define large slots 74 between the bases of sections, large slots 76 between the poles of each section, and narrow slots 78 between adjacent poles of adjacent sections.

An output winding, indicated generally at 80, is mounted within the large slots 74 and 76, and has a preferred winding configuration to be discussed more fully hereinafter in connection with FIG. 5a. Generally, the winding includes a plurality of coils wound around the bases 66 and around adjacent inner pole portions 68b and 69b of adjacent pole sections 64. To improve the capacity of the alternator without increasing the size or weight thereof, it is desirable to increase the number of winding turns of the coils while maintaining constant or actually decreasing the resistance thereof, and without increasing the size of the stator. To this end, and with reference also to FIG. 5a, the slots 74 readily accommodate a large number of windings of pairs of coils encompassing adjacent bases 66, with inwardly curved portions 82 of the core 62 facilitating positioning of the windings of the coils against their associated bases. Similarly, the slots 76 readily accommodate a large number of windings of pairs of coils encompassing adjacent pole portions 68b and 69b of adjacent pole sections. The slots 78 are desirably made as narrow as practicable with the adjacent pole portions 68b and 69b in a parallel relationship, whereby dead space in the eye of a coil therearound is decreased to decrease the length of the winding turns thereof, and winding space in the slots 76 is increased.

Figure 4B:
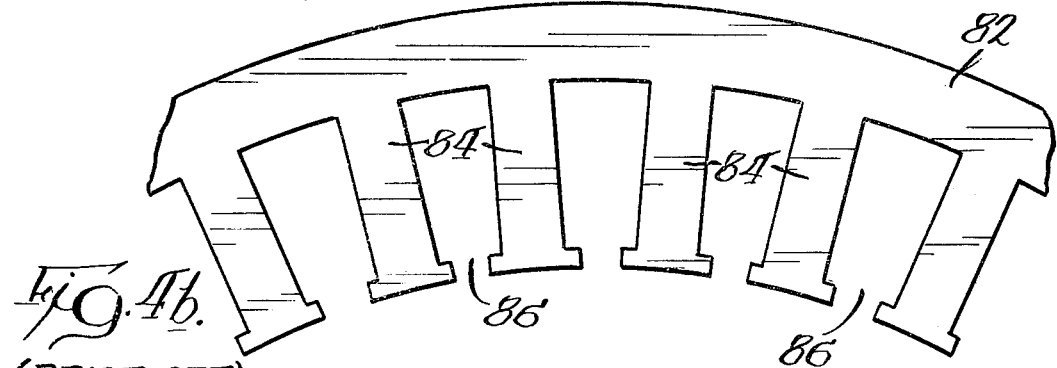
FIG. 4b is a diagrammatic axial view of a portion of a typical prior art stator, showing six of a plurality of identically configured poles thereof.

To better appreciate the advantages afforded by the novel configuration of the stator of the invention, reference is made to FIG. 4b which illustrates a portion of a typical prior art stator having outermost and innermost dimensions equal to those of the stator 60. The prior art stator has an annular core 82 and a plurality of poles 84 extending radially inward therefrom and defining slots 86 therebetween. In a known efficient wiring configuration for the stator, as shown in FIG. 5b, coils are diposed within the slots 86 and are positioned around adjacent pairs of poles 84. As is apparent from a comparison of FIGS. 4a and 4b, for poles of equal width, and therefore of equal reluctance, the configuration of the stator 60 of the invention provides both increased coil winding space and a decreased length of coil winding turns as compared with the prior art stator. The decreased length of the winding turns occurs mainly because of the relatively narrow width of the bases 66 of the stator of the invention in comparison with the overall width of a pair of adjacent poles of the prior art stator, and the increased number of winding turns occurs from the significantly greater coil winding areas afforded by the slots 74 and 76 as compared with the slots 86. The shorter length of the winding turns yields a lower coil resistance for a given number of winding turns, and as a consequence the stator of the invention may, for a given size, be wound with a greater number of winding turns having a lower overall resistance than would be obtainable with a conventional stator. This results in a wound stator having an improved Q-factor and, when the stator is used with a dynamoelectric machine, in an improvement in the capacity of the machine. In the alternative to using the salvaged slot area in the stator 60 to hold more winding turns, it may also be used to advantage by increasing the width of the poles therein, thereby lowering the reluctance of the stator and increasing the efficiency thereof.

The stator 60 is fixedly mounted on the excitation core 12 in spaced concentric relation to the poles 44a-44f and 50a-50f of the two rotor members 38 and 46, as is best illustrated in FIG. 2. As shown in FIG. 1, two housing members 88 and 90 are affixed to the core 62 of the stator to secure the stator in fixed relation to the excitation core. The housing 88 constitutes a cover for one end of the alternator, and the housing 90 extends over and is secured to the flange 18 of the excitation core by a plurality of mounting bolts 92.

Figure 5A:
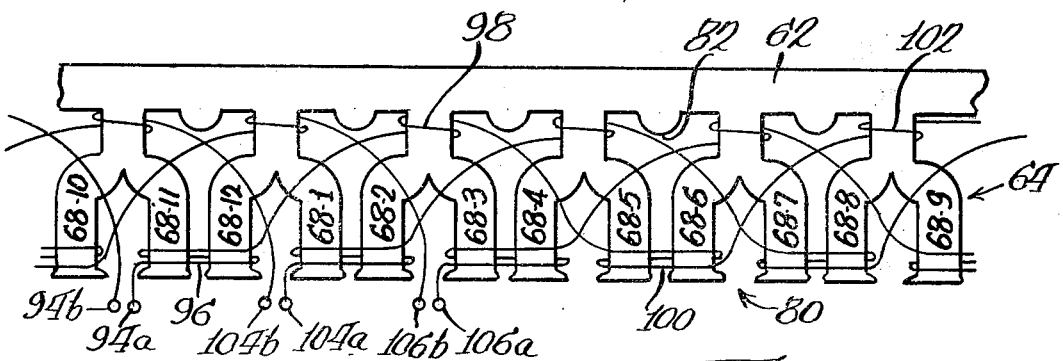
FIG. 5a is a diagrammatic illustration of a preferred three-phase stator winding configuration for a stator embodying the principles of the invention.
Figure 5B:
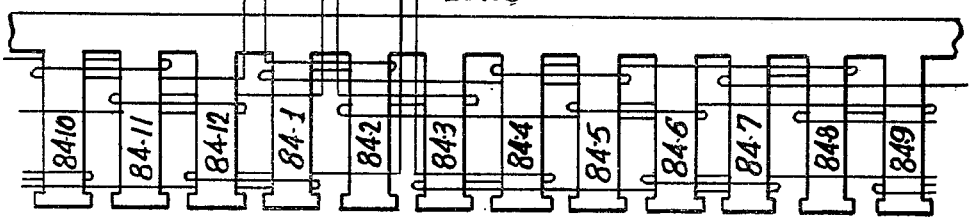
FIG. 5b is a diagrammatic illustration of a three-phase stator winding configuration for a typical prior art stator.

FIG. 5a shows a preferred construction for the output windings 80 of the stator. Although windings on only twelve stator poles 68-1 through 68-12 have been illustrated, corresponding to the number of poles that would be used in a three-phase alternator having only four rotor poles, the winding sequence would be the same for any number of stator poles, such as forty-eight poles, provided the number of poles satisfies the known requirement of being a multiple of six. The output winding includes three individual wiring sections, each having a predetermined and like number of coils connected in series with alternate coils wound in opposite directions. The first winding section begins at a terminal 94a from which a conductor extends to form (as viewed in an upwardly looking direction), a clockwise coil 96 encircling stator poles 68-11 and 68-12. The wire then extends to the trunk common with the poles 68-2 and 68-3 and forms a counterclockwise coil 98 therearound. Next the wire extends to the poles 68-5 and 68-6 and forms a clockwise coil 100 therearound, and then to the trunk common with the poles 68-8 and 68-9 to form a counterclockwise coil 102. The wire then terminates at a terminal 94b.

The second wiring section includes terminals 104a and 104b, and the third section includes terminals 106a and 106b. The second and third wiring sections are wound similar to the first, except that the second section begins two poles from the beginning of the first section, and the third section begins four poles from the beginning of the first section, with the net result that each wiring section is angularly displaced around the stator core with respect to each of the other two sections.

FIG. 5b illustrates, for the purpose of comparison, a known output winding construction for the conventionally structured stator of FIG. 4b. The output winding includes three separate wiring sections, the first connected to terminals 108a and 108b, the second to terminals 110a and 110b, and the third to terminals 112a and 112b. Each wiring section has a plurality of winding coils with alternate coils wound in opposite directions. Each coil of each section encompasses two stator poles and is separated from the next adjacent coil in that section by one stator pole not encompassed by a coil of that winding section, and each of the three winding sections is angularly displaced around the stator core relative to each of the other two winding sections. As a consequence of the relatively narrow width of the slots 86 and the generally large overall width of adjacent poles 84, the coils which may be wound on the stator 82 are of fewer turns, and the length of the turns is longer, as compared with the coils wound on the stator 60. With respect to FIG. 5a (and FIG. 5b as well), it will be recognized that the coils are shown with a minimum number of turns, and that in actual construction each coil usually includes additional turns.

In the operation of the alternator 10, the pulley 36 is turned to rotate the rotor, and a dc voltage is applied to the coil 22 through the external leads 24. With the coil energized, a magnetic flux is generated in the center tubular coil support 14. Some of the flux passes through a large area radial air gap A to the shaft 28, as indicated by the arrows X, and extends therefrom through the rotor member 38 to its poles 44a-44f. Another flux path to the poles 44a-44f extends across a low reluctance radial air gap B. An axial gap C is similarly traversed by flux, but the gap is preferably of high reluctance to preclude excessive axial loading of the bearings, an annular groove 114 being formed in the end face of the coil support 14 for this purpose. For the poles 50a-50f of the second rotor member 46, the flux path extends through the base 16 and the flange 18 of the core 12, and across a large area, low reluctance radial air gap D to the ring portion 48 of the rotor member. As the rotor poles 44a-44f and 50a-50f are rotated past the pole faces 70 of the stator poles 68, magnetic flux passes through the poles and the trunks, as linked together by the core 62, causes alternating voltages to be induced in the coils of the three winding sections. These voltages appear at the terminals to the winding sections, and may be either rectified for use in a dc electrical system or applied directly to a suitable three-phase load.

The invention thus provides a stator of an improved design which, for a given size, increases the space available for coil windings and decreases the distance over which they are wound. As a consequence, the amount of copper used in the stator windings is reduced, the stator exhibits an improved Q-factor, and when used with a dynamoelectric machine of a given size provides for an improved output therefrom.

While one embodiment of the invention has been described in detail, it is understood that various modifications and other embodiments thereof may be devised by one skilled in the art without departing from the spirit and the scope of the invention, as defined by the claims.

What is claimed is:

1. A stator body of magnetic material for an electromagnetic transducer, consisting essentially of an outer ring portion with a plurality of inwardly extending toothed elements, each of said toothed elements having a trunk portion connected at one end with said ring and a pair of spaced branch portions extending from an opposite end thereof, said branch portions terminating at inner ends thereof in an annular array, and including a stator winding having a first plurality of electrically conductive coils each encompassing an associated one of said trunk portions, and a second plurality of electrically conductive coils each encompassing an associated branch portion of one of said toothed elements and an associated branch portion of another of said toothed elements, said first and second pluralities of coils being electrically connected in series to alternate coils of said first and second pluralities.

2. A stator body of magnetic material for an electromagnetic transducer, consisting essentially of an outer ring portion with a plurality of inwardly extending toothed elements, each of said toothed elements having a trunk portion connected at one end with said ring and a pair of spaced branch portions extending from an opposite end thereof, said branch portions terminating at inner ends thereof in an annular array, and including a stator winding having a first plurality of electrically conductive coils each encompassing an associated one of said trunk portions and a second plurality of electrically conductive coils each encompassing an associated pair of adjacent branch portions of adjacent toothed elements, said first and second pluralities of coils being electrically connected in series to alternate coils of said first and second pluralities.

3. A stator for an electromagnetic transducer, comprising a stator core with a plurality of stator pole sections, each of said pole sections including a base portion connected at one end thereof with said core and a pair of stator poles extending in spaced relationship from an opposite end of said base, and an electrical stator winding including first, second and third winding sections, each said winding section including a given number of electrically conductive coils connected in series and alternately encompassing adjacent stator poles of adjacent pole sections and the base of a pole section not otherwise encompassed by a coil of that winding section, each winding section being angularly displaced around said stator core relative to each of said other two winding sections.

4. A stator as set forth in claim 3, successive coils in each said winding section being alternately wound in opposite directions and separated from each other by an adjacent pair of stator poles of adjacent pole sections.

5. A stator as set forth in claim 4, said coils encompassing said bases being disposed in relatively large areas between adjacent bases, said windings encompassing said adjacent stator poles of said adjacent pole sections being disposed within relatively large areas between said stator poles of said pole sections.

6. A dynamoelectric machine of a type including a rotor having two sets of oppositely polarized magnetic rotor poles interleaved with each other in an annular array, a stator of magnetic material, said stator having a stator core with a plurality of stator pole sections extending inwardly thereof, each of said pole sections including a base portion extending inwardly of said core and a pair of stator poles extending in a spaced relationship inwardly from an inner end of said base, said poles forming an annular array concentric with said rotor poles and displaced therefrom by an air gap, and an electrical stator winding, said machine being three-phase, said stator winding including first, second and third winding sections, each said winding section including a given number of electrically conductive coils connected in series and alternately encompassing adjacent stator poles of adjacent pole sections and the base of a pole section not otherwise encompassed by a coil of that winding section, each winding section being angularly displaced around said stator core relative to each of said other two winding sections.

7. A dynamoelectric machine as set forth in claim 6, successive coils in each said winding section being alternately wound in opposite directions and separated from each other by an adjacent pair of stator poles of adjacent pole sections.

8. A stator of magnetic material for an electromagnetic transducer, comprising an outer ring portion with a plurality of inwardly extending toothed elements, each of said toothed elements including a trunk portion connected with said ring and a pair of spaced branch portions extending from said trunk, said branch portions terminating in an annular array, and a stator winding including a first plurality of electrically conductive coils each encompassing an associated branch portion of one of said toothed elements and an associated branch portion of another of said toothed elements, said first and second pluralities of coils being interconnected to form first, second and third winding sections, each said winding section including a like number of coils connected in series and alternately encompassing (a) an associated branch portion of one of said toothed elements and an associated branch portion of an adjacent toothed element, and (b) a trunk portion of a toothed element not otherwise encompassed by a coil of that section, each said winding section being angularly displaced around said stator ring portion relative to each of said other two winding sections.

9. A stator as set forth in claim 8, successive coils in each said winding section being alternately wound in opposite directions.

10. A stator of magnetic material for an electromagnetic transducer, comprising an outer ring portion with a plurality of inwardly extending toothed elements, each of said toothed elements including a trunk portion connected with said ring and a pair of spaced branch portions extending from said trunk, said branch portions terminating in an annular array, and a stator winding including a first plurality of electrically conductive coils each encompassing an associated one of said trunk portions, and a second plurality of electrically conductive coils each encompassing an associated pair of adjacent branch portions of adjacent toothed elements, said first and second pluralities of coils being interconnected to form first, second and third winding sections, each said winding section including a like number of electrically conductive coils connected in series and alternately encompassing (a) an adjacent pair of branch portions of adjacent toothed elements and (b) a trunk portion of a toothed element not otherwise encompassed by a coil of that winding section, each said winding section being angularly displaced around said stator ring portion relative to each of said other two winding sections.

11. A stator as set forth in claim 10, successive coils in each said winding section being alternately wound in opposite directions and separated from each other by an adjacent pair of branch portions of adjacent toothed elements.

* * * * *